United States Patent Office.

REINHARD ISIDOR ROMAN, OF LONDON, ENGLAND.

SOLDER FOR USE WITH ALUMINIUM AND ITS ALLOYS.

SPECIFICATION forming part of Letters Patent No. 513,654, dated January 30, 1894.

Application filed October 30, 1893. Serial No. 489,576. (No specimens.) Patented in England September 19, 1893, No. 17,623.

*To all whom it may concern:*

Be it known that I, REINHARD ISIDOR ROMAN, a citizen of the Republic of France, temporarily residing at London, in the county of Middlesex, England, have invented a new and useful Improvement in Solders for Use with Aluminium and its Alloys, (for which I have obtained a patent in Great Britain, No. 17,623, bearing date the 19th day of September, 1893,) of which the following is a complete and full specification.

My invention relates to an improved solder for use with aluminium and aluminium alloys, and it consists of the hereinafter described combination of metals, the object being to attain a more perfect solder than those at present known.

The solders now known are defective for one or more of the following reasons:—They do not last for any length of time, they are difficult to use, they are not of good appearance, and they cannot stand any mechanical work but all these defects are overcome in my improved solder.

My improved solder consists of an alloy of aluminium, silver, nickel, tin, and zinc in the following proportions:—silver, two per cent.; nickel, five per cent.; aluminium, nine per cent.; tin, thirty-four per cent.; zinc, fifty per cent. This solder has an easy flow at from 650° to 750° Fahrenheit. With this solder no flux is necessary and any soldering iron or tool may be used, but I prefer to use one of pure aluminium.

To solder two surfaces together the said surfaces are thoroughly cleansed, first with nitric acid, secondly with caustic potash, and finally with clean cold water. After the two surfaces have thus been cleansed they are coated with the solder, brought lightly together, and heated by an ordinary soldering iron or tool, a blow pipe, or a Bunsen lamp, till the required temperature is reached to make the solder flow. Broadly the operation is the same as soldering silver, and no special knowledge or experience is required to exercise it.

I wish it to be particularly understood that I do not limit myself to the exact proportion of the several metals constituting my improved alloy, but that I hold myself at liberty to make such changes and alterations therein as is fairly within the spirit and scope of my invention.

What I claim as my invention, and desire to secure by Letters Patent, is—

The improved solder for use with aluminium and its alloys, consisting of an alloy of silver, nickel, aluminium, tin and zinc, as set forth.

REINHARD ISIDOR ROMAN.

Witnesses:
ROBT. ED. PHILLIPS,
W. H. JAMES,
*Both of 70 Chancery Lane, London, W. C.*